United States Patent Office 3,551,494
Patented Dec. 29, 1970

3,551,494
PROCESS FOR THE PREPARATION OF 1,1,1-TRI(SUBSTITUTED NITROGEN-CONTAINING ARYL)ETHANES
Selden Arthur Knudson and Michael Jay Spitulnik, Rochester, N.Y., assignors to Eastman Kodak Company, Rochester, N.Y., a corporation of New Jersey
No Drawing. Filed Dec. 21, 1967, Ser. No. 692,276
Int. Cl. C07c 87/28
U.S. Cl. 260—576         7 Claims

ABSTRACT OF THE DISCLOSURE 1,1-bis(p-diethylaminophenyl)-1-phenylethane and 1,1-diphenyl-1-(2-pyridyl)ethane are prepared by reacting specified 1,1-di(substituted nitrogen-containing aryl)ethylenes with benzene in the presence of a hydrogen chloride-aluminum chloride catalyst.

The present invention relates to the preparation of 1,1,1-tri(substituted nitrogen-containing aryl)ethanes and more particularly to the preparation of 1,1-bis(p-diethylaminophenyl)-1-phenylethane and 1,1-diphenyl-1-(2-pyridyl)ethane.

In the prior art, compounds such as those mentioned above were conventionally prepared in very low yields (below about 20 percent) by the reaction of an acetophenone and an aromatic compound in concentrated hydrochloric acid or by the action of a Grignard reagent ($RCG_2M_gX$) on a chloro triaryl methane. The low yields produced by such high cost methods have rendered production of such compounds on any type of commercial scale all but impracticable.

It is, therefore, the object of the present invention to provide an improved, more economical and more efficient method for the preparation of the two above-indicated 1,1,1-tri(substituted nitrogen-containing aryl)ethanes.

According to the present invention there is provided a process comprising reacting a 1,1-di(substituted nitrogen-containing aryl)ethylene selected from the group consisting of 1,1-bis(p-diethylaminophenyl)ethylene and 1-phenyl-1-(2-pyridyl)ethylene with benzene in the presence of an amount of hydrogen chloride sufficient to form a reactive hydrochloride with said 1,1-di(substituted nitrogen-containing aryl)ethylene and an effective amount of aluminum chloride, whereby benzene is added to the "1" carbon of said 1,1-di(substituted nitrogen-containing aryl)ethylene to yield the corresponding 1,1,1-tri(substituted nitrogen-containing aryl)ethane.

More particularly, the invention provides a process as described above comprising the steps of:

(1) Blending a 1,1-di(substituted nitrogen-containing aryl)ethylene selected from the group consisting of 1,1-bis(p-diethylaminophenyl)ethylene and 1-phenyl-1-(2-pyridyl)ethylene with hydrogen chloride to form a reactive hydrochloride; and (2) Reacting the reactive hydrochloride with an excess of benzene in the presence of an effective amount of aluminum chloride to thereby cause the addition of benzene in the "1" carbon of the 1,1-di(substituted nitrogen-containing aryl)ethylene and form the corresponding, 1,1,1-tri(substituted nitrogen containing aryl)ethane.

The reactions which occur when the processes of this invention are utilized are best demonstrated using structural formulas as follows:

(I)

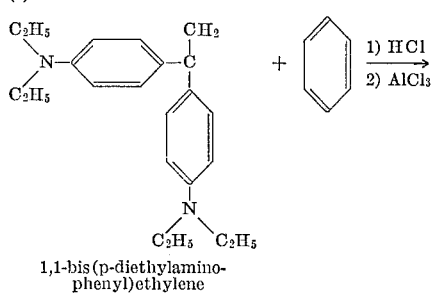

1,1-bis(p-diethylamino-phenyl)ethylene

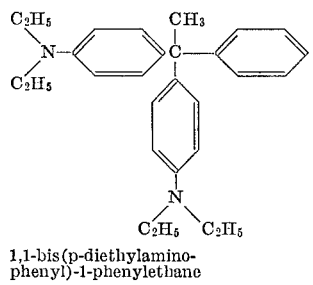

1,1-bis(p-diethylamino-phenyl)-1-phenylethane (II)

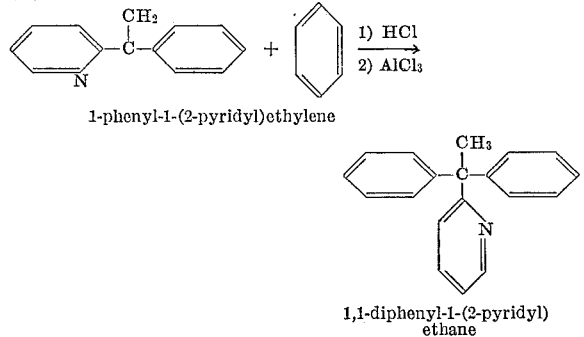

1-phenyl-1-(2-pyridyl)ethylene 1,1-diphenyl-1-(2-pyridyl)ethane

In I, the 1,1-bis(p-diethylaminophenyl)ethylene is converted to the 1,1-bis(p-diethylaminophenyl)-1-phenylethane when benzene is added to the "1" carbon of the former compound.

In II, the 1-phenyl-1-(2-pyridyl)ethylene which can be obtained by dehydrating methylphenyl 2-pyridylmethanol in situ in an organic solvent (as shown in the examples below) is converted to the 1,1-diphenyl-1-(2-pyridyl)ethane when the benzene is added to the "1" carbon of the former compound.

As at least partially demonstrated by the two specifically preferred procedures for carrying out the processes of the present invention which are set out below, the initial blending of the 1,1-di(substituted nitrogen-containing aryl)ethylene and hydrogen chloride may be carried out in a variety of manners. For example, the starting material can be first dissolved in an organic solvent that is inert to Friedel-Crafts catalysts, preferably ethyl ether although ethylene chloride, carbon disulfide, nitrobenzene and other Friedel-Crafts inert solvents may also be substituted therefor. Once the reagent is dissolved hydrogen chloride gas can then be bubbled through the solution until the reactive hydrochloride described below is formed. The completion of the formation of the hydrochloride is easily detected when the hydrogen chloride is bubbled into the solution as suggested above, as being the point where the amount of hydrogen chloride bubbling from the solution is the same as that being added.

The hydrogen chloride is absorbed by the formation of a hydrochloride at the amino group or groups of the 1,1-di(substituted nitrogen-containing aryl)ethylene to form a reactive hydrochloride capable of reacting with benzene in the presence of aluminum chloride and apparently some of the gas is also used up in saturating the ethylenic double bond of the 1,1-di(substituted nitrogen-containing aryl)ethylene.

In Reaction I above, formation of the reactive hydrochloride generally requires the incorporation of from at least about 2 to about 3 moles of hydrogen chloride for each mole of the 1,1-bis(p-diethylaminophenyl)ethylene utilized, with improved efficiency being obtained within the range of from about 2.5 to about 3 moles and optimum yields being achieved when approximately 2.8 moles of the gas are utilized in the blending.

As should be clear from the discussion above, more than 3 moles of hydrogen chloride per mole of the 1,1-di(substituted nitrogen-containing aryl)ethylene can be used in the processes of this invention without harmful effect, however, the excess hydrogen chloride serves no useful purpose and hence, if for only economic reasons, the use of a maximum of 3 moles of hydrogen chloride per mole of the ethylene is preferred.

The variation in the amount of hydrogen chloride which is absorbed in any given reaction or the amount thereof which is blended into the solution in any given case is caused largely by a variation in the amount of addition of hydrogen chloride which occurs across the double bond which addition varies with the temperature and pressure under which the blending is carried out. It has not been determined whether this addition occurs before, during, or after formation of the di-hydrochloride but only that it generally does occur to some degree and hence that some excess of hydrogen chloride (above 2 molar equivalents) should be added. A further variation occurs because of a certain small amount of absorption of the hydrogen chloride by the solvent in which the 1,1-di(substituted nitrogen-containing aryl)ethylene is dissolved.

In Reaction II above, formation of the reactive hydrochloride generally occurs with the incorporation of from at least about 1 to about 2 moles of hydrogen chloride gas per mole of the 1-phenyl-1-(2-pyridyl)ethylene utilized, optimum yields being obtained when about 1.6 to about 1.8 moles are used for saturation.

In still another method for carrying out the process of the invention, the 1,1-di(substituted nitrogen-containing aryl)ethylene need not be dissolved in a solvent other than benzene during the time the formation of the reactive hydrochloride is accomplished. The solvent for the reagent may be, in fact, benzene, in which case the evaporating step of the first preferred embodiment set forth below can be eliminated and the balance of the reaction carried out in the same medium in which the formation of the reactive hydrochloride is performed.

The particular order of addition of the various raw materials that are necessary for the successful practice of this invention is apparently not critical. However, it has been found that certain manipulative procedures, when followed, result in somewhat improved results.

In this regard, according to two preferred embodiments of this invention, the process is carried out according to two very specific procedures which have demonstrated economic and yield advantages. The first of these preferred methods comprises the steps of:

(1) Blending a 1,1-di(substituted nitrogen-containing aryl)ethylene selected from the group consisting of 1,1-bis(p-diethylaminophenyl)ethylene and 1-phenyl-1-(2-pyridyl)ethylene dissolved in a suitable solvent selected from the group consisting of ethyl ether, ethylene chloride, carbon disulfide and nitrobenzene with hydrogen chloride gas;

(2) Removing the solvent by evaporation or otherwise;

(3) Adding an excess of benzene and preferably from about 2 to about 4 moles of aluminum chloride per mole of 1,1-di(substituted nitrogen-contaning aryl)ethylene utilized to form a reaction mixture; and (4) Heating the reaction mixture for a period of time sufficient to accomplish addition of the benzene to the "1" carbon of the 1,1-di(substituted nitrogen-containing aryl) ethylene to yield the corresponding 1,1,1-tri(substituted nitrogen-containing aryl)ethane.

An alternate preferred embodiment comprises the steps of:

(1) Blending the 1,1-di(substituted aryl)ethylene dissolved in benzene with hydrogen chloride gas;

(2) Adding from about 2 to about 4 moles of aluminum chloride per mole of 1,1-di(substituted aryl)ethylene utilized to the product of step 1 to yield a reaction mixture; and (3) Heating the reaction mixture for a period of time sufficient to cause addition of benzene to the "1" carbon atom of the 1,1-di(substituted nitrogen-containing aryl) ethylene.

The advantages of utilizing the first preferred procedure which calls for dissolving the reagent in a solvent such as ethyl ether prior to formation of the hydrochloride is that formation occurs more rapidly in such a medium and is thus more assuredly completed in an overall shorter period of time.

Blending may be achieved by any of the conventional methods of mixing a solution with a gas, a preferred method used in the examples below being to bubble the gas through the solution.

Subsequent to formation of the reactive hydrochloride whether by one or the other of the preferred methods, the hydrochloride can be blended in an amount of benzene sufficient to provide an adequate reaction medium as well as reagent for the reaction to follow. As demonstrated by Reactions I and II above, at least about one mole of benzene is needed per mole of the 1,1-di(substituted aryl)ethylene utilized to produce the desired product.

As a further alternative, the reaction may be carried out in a medium other than the benzene solution utilized in the preferred embodiments set forth above. Such a medium can consist of any of the conventional Friedel-Crafts solvents which are chosen because of their inertness under Friedel-Crafts conditions. These include, ethylene chloride, diethyl ether, nitrobenzene, and carbon disulfide, among other such solvents well known to those skilled in the art. When this approach to the process is used, it is generally preferred, when optimum results are desired, to use an excess (i.e., more than one molar equivalent based upon the amount of the 1,1-di(substituted nitrogen-containing aryl)ethylene used) of the benzene reactant in the reaction mixture.

Subsequent to dissolution of the reactive hydrochloride in a suitable solvent which, as just described, can be benzene or one of the Friedel-Crafts inert solvents mentioned above, the aluminum chloride catalyst is added to the reactive hydrochrloride in benzene, reactive hydrochloride in Friedel-Crafts inert solvent or reactive hydrochloride and benzene in a Friedel-Crafts inert solvent solution to form the completed reaction mixture.

The amount of aluminum chloride catalyst added is dependent upon the number of amine groups present in the reagent and the number of Friedel-Crafts-type complexes which are formed upon addition. Thus, in Reaction I above adequate results can be obtained when from about 2 to about 4 moles of aluminum chloride per mole of the 1,1-di(substituted nitrogen-containing aryl)ethylene are added to the reaction mixture. Improved results are achieved when from about 3 to about 4 moles of the aluminum chloride are added and optimum yields of from about 70 to 80% are obtained when about 3.5 moles of the aluminum chloride catalyst are used.

As stated above in regard to the amount of hydrogen chloride used in the processes of this invention, the amount of aluminum chloride used may exceed the suggested maximum of 4 moles per mole of 1,1-di(substituted nitrogen-containing aryl)ethylene without adverse effect upon the overall reaction, however, again if for no other reason than economics, it is preferred to use a maximum of 4 moles of the aluminum chloride per mole of the ethylene.

In Reaction II above, from about 2 to about 3 moles of aluminum chloride per mole of the 1,1-di(substituted nitrogen-containing aryl)ethylene utilized give satisfactory results with optimum yields being achieved when about 3 moles of the catalyst are added.

Subsequent to the addition of the aluminum chloride catalyst, the reaction mixture comprising the reactive hydrochloride and aluminum chloride catalyst in benzene mixture of the preferred embodiments or the reactive hydrochloride, aluminum chloride and excess benzene of the alternative embodiment is heated for a period sufficient to produce addition of benzene at the "1" carbon of the 1,1-di(substituted nitrogen-containing aryl)ethylene to yield the corresponding 1,1,1-tri(substituted nitrogen-containing aryl)ethane as shown in Reactions I and II above. The period for which the reaction mixture is heated is not critical and generally a minimum heating period of about 30 minutes will produce some of the desired product. The reaction usually requires anywhere from about 1 to about 10 hours of heating depending upon the amounts of catalyst used to achieve yields of above about 70%, with a heating period of between about 2 and about 6 hours providing optimumly high yields when the preferred ranges of catalyst concentration are used. Heating is preferably performed at a temperature of from about 50 to about 90° C.

At the completion of the reaction, the 1,1,1-tri(substituted nitrogen-containing aryl)ethane may be separated from the benzene solution and reaction medium according to any conventional separation technique.

According to the preferred embodiments set forth in the examples below, separation is accomplished by pouring the reaction mixture onto ice, heating until the solidified ice and benzene solution melts and then rendering the melt alkaline by the addition of 25 to 50% sodium hydroxide solution or some other base such as sodium carbonate, potassium hydroxide, potassium carbonate or any other alkali or alkaline earth hydroxide or carbonate which is a stronger base than the amine.

It should be noted that if an excess of sodium hydroxide or some other strong alkali hydroxide is added in the alkalinization, a white aluminum hydroxide precipitate will form which must be separated by extraction from the simultaneously precipitated desired product.

Once the solution is alkaline, the product may be extracted therefrom with ethylene chloride or ethyl ether, the solvent evaporated and the product isolated.

Alternatively, the crude product may be left in the alkaline benzene solution, that solution concentrated and the product crystallized therefrom.

Purification of crude product may be achieved by recrystallization from a ligroine or mixture of methanol, pentanes, and other lower alkyl hydrocarbons which is commonly used for such procedures. The incorporation of a decolorizing carbon in the recrystallization mixture according to conventional methods is, of course, also recommended.

Although it is preferred that the reagents used in the processes of this invention be substantially water free, it is not critical that they be so. The presence of water in any of the reagents will, however, cause the formation of aluminum hydroxide and hydrogen chloride when it reacts with the aluminum chloride catalyst thus effectively removing some of the aluminum chloride catalyst from the reaction mixture. Thus, if water is present in the system an excess of the aluminum chloride catalyst should be added initially to insure a sufficiently high catalyst concentration and to compensate for removal of a portion thereof by the action of the water.

The following examples will serve to better illustrate the process of the present invention:

EXAMPLE I

In a 500 ml. three-necked flask equipped with a gas addition tube are placed 20 g. (0.062 mole) of 1,1-bis(p-diethylaminophenyl)ethylene and 300 ml. of ethyl ether. The solution is saturated with 4.8 g. hydrogen chloride gas. The ethyl ether is distilled at reduced pressure and the residue is dried at 60° C. at reduced pressure. Then 300 ml. of dry benzene and 26 g. (.194 mole) of aluminum chloride are added. The polyphase mixture is stirred and heated at reflux for 4 hours.

The mixture is poured into 400 g. of ice and heated until the ice and benzene melt. The benzene layer is separated from the acid layer, washed with sodium carbonate solution, separated from the aqueous layer and is set aside to be used later. The acid layer is neutralized with 1.04 moles of 50% sodium hydroxide solution. The precipitate that is formed is filtered and washed well with water. The crude product is dissolved in benzene, separated from any residual water, filtered and combined with the benzene layer retained from the original drown-out.

The benzene solution is concentrated at reduced pressure, and the oil is recrystallized from a minimum amount of boiling ligroine. A second crop is obtained by concentrating the mother liquors to one-third their original volume and cooling overnight. The yield of crude product is 20 g., which 80% of the theoretical amount of 25 g.

Purification

The crude product is dissolved in 50 ml. of ligroine at reflux, and 150 ml. of a second ligroine is added. The solution is treated with Nuchar, filtered and cooled overnight. The light yellow product has a melting point of 95–97° C. A mixed melting point run with a sample of product made according to a known process showed no depression.

The yield is 17.5 g. or 70% of the theoretical amount of 25 g.

EXAMPLE II

Hydrogen chloride gas is passed into a solution of 1-phenyl-1-(2-pyridyl)ethanol (19.9 g.) in benzene (200 ml.) until the solution is saturated. To this is added aluminum chloride (40.5 g.). The mixture is refluxed with stirring for three hours and subsequently poured onto ice, melted and made alkaline with 25% NaOH solution (150 ml.). The mixture is extracted with 100 ml. of ethyl ether, dried and concentrated by heating at reduced pressure to yield 20.5 g. of product. A sample of the product recrystallized from petroleum ether melted at 55–6° C. Analysis of the product compared with the calculated analysis for 1,1-diphenyl-1-(2-pyridyl)ethane yielded the following results:

Calculated for ($C_{19}H_{17}N$) (percent): C, 88.1; H, 6.5; N, 5.4. Found (percent): C, 88.3; H, 6.5; N, 5.4.

NMR confirmed the expected structure. The yield is 75%.

EXAMPLE III 1-phenyl-1-(2-pyridyl)ethylene is treated the same as the 1,1-bis(p-diethylaminophenyl)ethylene in Example I. The product has a melting point of 55–6° C. and shows substantially the same analysis as the product of Example II above. NMR confirms the predicted structure.

EXAMPLE IV 1,1-bis(p-diethylaminophenyl)ethylene is treated in the same manner as the 1-phenyl-1-(2-pyridyl)ethylene of Example II except that extraction is made with ethylene chloride instead of ether. The product has a melting point of 95–97° C., an infrared spectrum identical to that of 1,1 - bis(p-diethylaminophenyl)-1-phenylethane prepared according to known methods is produced thereby and a mixed melting point run with a sample of that compound made by known methods shows no melting point depression. The yield is 72%.

As in the case of many reactions, it is advantageous in the present reactions to leave a "heel" (i.e., a small portion, normally less than 10% of the product of the previous reaction batch) in the reaction vessel to hasten the reaction and formation of the desired product of the subsequent batch and hence shorten the heating period required to complete reaction.

Studies and experiments conducted in the course of the development of the above-described process and aimed at establishing the utility of this type of reaction and to define its scope led to many frustrating and disappointing results and yielded the general conclusion that the specific reactions of this invention and products disclosed herein are unique.

The following discussion which indicates some of the "dead-end" attempts to make the process work along conventional Friedel-Crafts lines using homologs of the various reagents utilized in the successful process described above should serve to indicate the reasons for this conclusion.

As a test of the breadth of the utility of the process, alkylation of a number of different aromatic hydrocarbons was attempted with a variety of olefins. The results of these attempts are as follows:

(1) Benzene alkylated with 1,1-diphenylethylene and 1-(p-chlorophenyl)-1-phenylethylene gave polymers;

(2) 1,1-bis(p-diethylaminophenyl)ethylene, which was condensed successfully with benzene, gave products which could not be purified when reacted with p-xylene, naphthalene and N,N-diethylaniline;

(3) Attempted alkylation of benzene with 1,1-(p-diethylaminophenyl)-1-propene and 1,1-(p-diethylaminophenyl)-1-butene gave respectively no reaction and a product which could not be identified; and (4) The alkylation of benzene with 1,1-(p-diethylaminophenyl)-2-phenylethylene under the same conditions produced a compound having a melting point of 146–7° C. which was identified as 1,1-bis(p-diethylaminophenyl)-2,2-diphenylethane by NMR and mass spectrometry.

The invention has been described in detail with particular reference to preferred embodiments thereof, but it will be understood that variations and modifications can be effected within the spirit and scope of the invention as described hereinabove and as defined in the appended claims.

We claim:

1. A process for preparing 1,1-bis(p - diethylaminophenyl)-1-phenylethane which comprises contacting a solution of 1,1-bis(p-diethylaminophenyl)ethylene in a solvent with hydrogen chloride in an amount of at least two moles of hydrogen chloride per mole of 1,1-bis(p-diethylaminophenyl)ethylene to form the hydrochloride of 1,1-bis(p-diethylaminophenyl)ethylene and heating said hydrochloride with benzene in contact with at least about two moles of aluminum chloride per mole of said hydrochloride to form said 1,1-bis(p - diethylaminophenyl)-1-phenylethane.

2. A process as described in claim 1 wherein said hydrogen chloride is employed in an amount of about 2.5 to about 3 moles per mole of said 1,1-bis(p-diethylaminophenyl)ethylene and said aluminum chloride is employed in an amount of from about 3 to about 4 moles per mole of said hydrochloride of 1,1-bis(p-diethylaminophenyl)ethylene.

3. A process as described in claim 1 wherein said solvent is benzene.

4. A process as described in claim 1 wherein said solvent is a member selected from the group consisting of ethyl ether, ethylene chloride, nitrobenzene and carbon disulfide.

5. A process as described in claim 4 wherein said solvent is removed after formation of said hydrochloride and said benzene and aluminum chloride are then added.

6. A process as described in claim 1 wherein said hydrochloride is heated with benzene in contact with aluminum chloride at a temperature of about 50° C. to about 90° C.

7. A process as described in claim 1 wherein said hydrochloride is heated with benzene in contact with aluminum chloride for a period of from about one to about ten hours.

No references cited.

HENRY R. JILES, Primary Examiner

H. I. MOATZ, Assistant Examiner

U.S. Cl. X.R.

260—290